(12) United States Patent
Veneklase

(10) Patent No.: US 9,053,316 B2
(45) Date of Patent: Jun. 9, 2015

(54) SECURE ACCESS COMPUTER SYSTEM

(75) Inventor: Brian J. Veneklase, San Antonio, TX (US)

(73) Assignee: C.H.I. Development Mgmt. Ltd. III, LLC, Wilmington, DE (US)

( * ) Notice: Subject to any disclaimer, the term of this patent is extended or adjusted under 35 U.S.C. 154(b) by 224 days.

(21) Appl. No.: 12/069,365

(22) Filed: Feb. 8, 2008

(65) Prior Publication Data

US 2008/0148371 A1 Jun. 19, 2008

Related U.S. Application Data

(60) Division of application No. 10/391,394, filed on Mar. 17, 2003, now Pat. No. 7,337,467, which is a continuation of application No. 09/245,249, filed on Feb. 5, 1999, now Pat. No. 6,609,206, which is a continuation of application No. 08/733,897, filed on Oct. 28, 1996, now Pat. No. 5,881,226.

(51) Int. Cl.
*G06F 21/34* (2013.01)
*G06F 21/43* (2013.01)
*G06F 21/42* (2013.01)
*H04L 29/06* (2006.01)

(52) U.S. Cl.
CPC .............. *G06F 21/43* (2013.01); *G06F 21/42* (2013.01); *H04L 63/083* (2013.01); *H04L 63/104* (2013.01); *H04L 63/18* (2013.01)

(58) Field of Classification Search
CPC ....................................................... G06F 21/34
USPC ............................................................. 726/5
See application file for complete search history.

(56) References Cited

U.S. PATENT DOCUMENTS 4,484,306 A 11/1984 Kulczyckyj et al.
4,779,224 A 10/1988 Moseley et al.
(Continued)

FOREIGN PATENT DOCUMENTS

AU 1390395 8/1995
EP 0262859 6/1988
(Continued)

OTHER PUBLICATIONS

"Non Final Office Action", U.S. Appl. No. 08/738,897, (Feb. 2, 1998).
(Continued)

*Primary Examiner* — Jacob Lipman
(74) *Attorney, Agent, or Firm* — Perkins Coie LLP

(57) ABSTRACT

Several embodiments of computer security systems are described and which are adapted to grant an authorized individual access to a secured domain, such as a computer or data stream. In one embodiment, the security system comprises: an analyzing means for receiving first and second passwords, each of said passwords being transmitted over a first communication channel, analyzing said first password, transmitting a first signal output only if said first password is authorized, and granting access to said secured domain only if said second password is substantially identical to a code; and a random code generating means for generating said code, transmitting said code over a second communication channel upon receipt of first signal output, and transmitting said code to said analyzing means; and a notification means for receiving said code and for notifying said authorized individual of the identity of said code.

23 Claims, 4 Drawing Sheets

(56) References Cited

U.S. PATENT DOCUMENTS

| | | |
|---|---|---|
| 4,801,787 A | 1/1989 | Suzuki |
| 4,910,772 A | 3/1990 | Matias et al. |
| 5,081,675 A | 1/1992 | Kittirutsunetorn |
| 5,226,080 A | 7/1993 | Cole et al. |
| 5,231,668 A | 7/1993 | Kravitz |
| 5,245,658 A | 9/1993 | Bush et al. |
| 5,261,070 A | 11/1993 | Ohta |
| 5,280,581 A | 1/1994 | Bathrick et al. |
| 5,303,303 A | 4/1994 | White |
| 5,375,243 A | 12/1994 | Parzych et al. |
| 5,475,762 A | 12/1995 | Morisawa et al. |
| 5,495,235 A | 2/1996 | Durinovic-Johri et al. |
| 5,566,169 A | 10/1996 | Rangan et al. |
| 5,623,637 A | 4/1997 | Jones et al. |
| 5,657,452 A | 8/1997 | Kralowetz et al. |
| 5,668,811 A | 9/1997 | Worsley et al. |
| 5,682,475 A | 10/1997 | Johnson et al. |
| 5,684,951 A | 11/1997 | Goldman et al. |
| 5,719,941 A | 2/1998 | Swift et al. |
| 5,852,711 A | 12/1998 | Campbell |
| 5,881,226 A | 3/1999 | Veneklase |
| 6,088,047 A | 7/2000 | Bose et al. |
| 6,097,927 A | 8/2000 | LaDue |
| 6,771,597 B2 | 8/2004 | Makansi et al. |

FOREIGN PATENT DOCUMENTS

| | | |
|---|---|---|
| EP | 0 558 326 A1 | 9/1992 |
| EP | 0 844 551 A2 | 5/1998 |
| GB | 2 229 020 A | 9/1990 |
| GB | 2300288 | 10/1996 |
| WO | WO 95/19593 | 7/1995 |
| WO | WO 96/24993 | 8/1996 |

OTHER PUBLICATIONS

"Final Office Action", U.S. Appl. No. 08/738,897, (Sep. 1, 1998).
"Notice of Allowance", U.S. Appl. No. 08/738,897, (Oct. 1, 1998).
"Non Final Office", U.S. Appl. No. 9/245,249, (Mar. 26, 2002).
"Final Office Action", U.S. Appl. No. 9/245,249, (Jul. 30, 2002).
"Notice of Allowance", U.S. Appl. No. 9/245,249, (Dec. 17, 2002).
"Non Final Office Action", U.S. Appl. No. 10/391,394, (Jan. 19, 2007), 8 pages.
"Notice of Allowance", U.S. Appl. No. 10/391,394, (Sep. 25, 2007), 10 pages.
"Non Final Office Action", U.S. Appl. No. 09/282,954, (Mar. 20, 2003), 7 pages.
"Non Final Office Action", U.S. Appl. No. 09/282,954, (Oct. 27, 2003), 5 pages.
"Final Office Action", U.S. Appl. No. 09/282,954, (Dec. 16, 2004), 8 pages.
"Notice of Allowance", U.S. Appl. No. 09/282,954, (Apr. 11, 2005), 13 pages.
"Data Transmission Error Corrector", *Cit-Alcatel*.
Hwang, Kai "Advanced Computer Architecture Paralielism, Scalability, Programmability", (1993).
Kai Hwang, Advanced Computer Architecture, book, 1993, Chapter 8. McGraw-Hill, Inc. United States, pp. 403-473.
European Search Report, European Patent Office, Feb. 1998.
European Search Report, European Patent Office, May 15, 1998.

SECURE ACCESS COMPUTER SYSTEM

CROSS-REFERENCE TO RELATED APPLICATIONS

This application is a divisional of U.S. patent application Ser. No. 10/391,394, filed Mar. 17, 2003 (U.S. Pat. No. 7,337,467), which is a continuation of U.S. patent application Ser. No. 09/245,249, filed Feb. 5, 1999 (U.S. Pat. No. 6,609,206), which is a continuation of U.S. patent application Ser. No. 08/738,897, filed Oct. 28, 1996 (U.S. Pat. No. 5,881,226). All applications listed above are incorporated herein by reference in their entireties.

FIELD OF THE INVENTION

The present invention relates to a security and/or access restriction system and, in one embodiment, to a security and/or access restriction system which is adapted to grant only authorized users access to a computer system and/or to certain data which may be resident within the computer system and/or resident within a communications channel and/or other communications medium.

BACKGROUND OF THE INVENTION

In recent years, computers have proliferated in all parts of worldwide society, including but not limited to, banking, financial services, business, education, and various governmental entities. For instance and without limitation, these computer systems allow individuals to consummate financial transactions, to exchange confidential scientific and/or medical data, and to exchange highly proprietary business planning data. Hence, these computer systems require and/or allow very sensitive and confidential data to be stored and transmitted over great geographic distances.

Moreover, the rise of multinational communications networks, such as the publicly available Internet communications system, has truly made the world a smaller place by allowing these computers, separated by great geographic distances, to very easily communicate and exchange data. In essence, these worldwide communications channels/networks, sometimes collectively referred to as "the Information Superhighway" have electronically connected the peoples of the world—both the good and the very bad.

That is, while these computer systems have increased efficiency and greatly changed the manner in which we work and interact, they have been especially prone to unauthorized "break-ins", viral destruction, and/or unauthorized data modifications. Accordingly, the rather sensitive and confidential data which is stored and used within these computer systems and transmitted between these computer systems has been the target of attack by people known as "hackers" and by high level and very sophisticated espionage and industrial spies. Computer access security and data transmission security has recently come to the forefront of importance and represents one of the great needs of our times.

Many attempts have been made to create and utilize various techniques (hereinafter the term "technique" as used and/or employed in this Application refers to any combination of software, hardware, and/or firmware which comprise an apparatus and a methodology whose components cooperatively achieve an overall security objective) to "ensure" that only authorized users are allowed to gain access to these respective computer systems. These prior techniques, while somewhat effective, suffer from various drawbacks.

For example, one such prior computer system security technique comprises the use of predetermined "passwords". That is, according to this security technique, each computer system has a list of authorized passwords which must be communicated to it before access is given or allowed. In theory, one or more "trusted" system administrators distribute these "secret" passwords to a group of authorized users of a computer system. The "secret" nature of the passwords, in theory, prevents unauthorized users from accessing the computer system (since presumably these unauthorized users do not have the correct passwords). This technique is not very effective since oftentimes those authorized individuals mistakenly and unwittingly expose their password to an unauthorized user. Moreover, this technique of data security may be easily "broken" by a "hacker's" deliberate and concentrated attempt at automatically inputting, to the targeted computer, hundreds and perhaps thousands of passwords until an authorized password is created.

In addition to the prior password technique other, more sophisticated access techniques are known and used. For example, there are known techniques which require the possession of a physical object or feature, such as "access cards" which are "read" by a card reading device and biometric authentication techniques (e.g. requiring the initial input of such authorized user physical characteristics as fingerprints and eye patterns and the later comparison of these input patterns to those of a "would-be" user). Both of these prior techniques are relatively complicated, are relatively costly, and are prone to error, such as and without limitation, mistaken unauthorized entry due to their complexity. These techniques are also prone to unauthorized entry by use of counterfeit and/or stolen cards, objects, and fingerprint readers Other prior data security techniques, such as encryption, attempt to prevent unauthorized use of transmitted data or unauthorized access to a computer system by modifying and/or changing the transmitted data in a certain manner, and/or requiring the transmission and receipt of modified data before access is granted. While somewhat effective, these prior encryption techniques are relatively costly and complicated and require one or more known "encryption keys" which are in constant exchange between users and which are themselves susceptible to theft and/or inadvertent disclosure. Furthermore, the best-known and perhaps strongest encryption algorithm is proprietary and cannot be used without a costly license. Moreover, since the encrypted message still provides all of the transmitted data, in some form, it is still possible for one to gain access to the entire data stream by "breaking the encryption code". Since no encryption algorithm is ever considered "unbreakable", encryption is not considered to be a "foolproof" security solution.

There is therefore a need to provide a technique to substantially prevent the unauthorized access to one or more computer systems and which overcomes the various drawbacks of these afore-described prior techniques. There is also a need to provide a technique to substantially prevent the unauthorized interception and use of transmitted data and which overcomes the various drawbacks of the prior art. Applicant's invention(s) seek and do meet these needs. Applicant's invention, in one embodiment, achieves these objectives by splitting the data into a plurality of separate communication channels, each of which must be "broken" for the entire data stream to be obtained. In essence, in this embodiment of Applicant's invention, cooperatively form the entire message. The splitting of the data in this manner may also "fool" the would be data thief into believing that he or she has obtained all of the data when, in fact, only several communication channels are obtained.

SUMMARY OF THE INVENTION

While a number of "objects of the invention" are set forth below, it should be realized by one of ordinary skill in the art that the invention(s) are not to be limited, in any manner, by these recited objects. Rather, the recited "objects of the invention" are to be used to place Applicant's various inventions in proper overall perspective and to enable the reader to better understand the manner in which Applicant's inventions are to be made and used, especially in the preferred embodiment of Applicant's invention. Accordingly, the various "objects of the invention" are set forth below:

It is a first object of the present invention to provide a technique to substantially ensure that only authorized users gain access to a computer system.

It is a second object of the invention to provide a technique to substantially ensure that only authorized users gain access to a computer system and which overcomes the various previously delineated drawbacks of the prior computer system security techniques.

It is a third object of the invention to provide a technique to substantially ensure that only authorized users have access and use of certain transmitted data appearing, for example, within a data stream.

It is a fourth object of the invention to provide a technique to substantially ensure that only authorized users have access and use of certain transmitted data and/or certain hardware, software, and/or firmware which cooperatively form and/or comprise a computer system, and that this technique overcomes the various previously delineated drawbacks of the prior techniques.

According to a first aspect of the present invention, a security system is provided. Particularly, the security system is adapted to be used in combination with a computer and to only grant an authorized individual access to the computer. The security system comprises, in one embodiment, password means for receiving a password by use of a first communications channel; and code generation means, coupled to said password means, for generating a code by use of a second communications channel, and to allow that individual access to the computer system only if that individual generates and communicates the code to the code generation means.

According to a third aspect of the present invention, a method is provided for use with a computer and effective to substantially prevent an unauthorized user from accessing the computer. The method comprises, in one embodiment, the steps of assigning a password to the user; receiving the password by use of a first communications channel; generating a code in response to the received password; transmitting the code by use of a second communications channel to the user; transmitting the code to the computer; and allowing access to the computer only after the code is transmitted to the computer.

According to a fourth aspect of the present invention, a security system is provided to grant an authorized individual access to a secured stream of data bits. In one embodiment, the data security system comprises a data stream dividing means for receiving said stream of data bits and dividing said stream of data bits into a plurality of sub-streams; transmitting means for transmitting said sub-streams in a predetermined order over a communication channel; and a decoding means for receiving said sub-streams and for recombining said received sub-streams to create said secured stream of data bits.

Further objects, features, and advantages of the present invention will become apparent from a consideration of the following description, the appended claims, and/or the appended drawings. It should further be realized by one of ordinary skill in the art that the previously delineated objects and aspects of the invention are for illustration purposes only and are not to be construed so as to limit the generality of the inventions and/or to limit the interpretation to be given to the various appended claims. Moreover, it should also be realized by those of ordinary skill in the art that the term "communications channel" as used throughout this Application refers to any physical and/or electromagnetic means or method of transferring and/or communicating information from one or more sources to one or more receivers. Moreover, the term "communications channel" should be given the broadest known interpretation covering any method and/or medium which facilitates the transfer of information and/or over which such information is transferred.

BRIEF DESCRIPTION OF THE DRAWINGS

For a fuller and more complete understanding of the nature and objects of the present invention, reference should be had to the following drawings wherein.

DETAILED DESCRIPTION OF THE INVENTION

Figure 1:
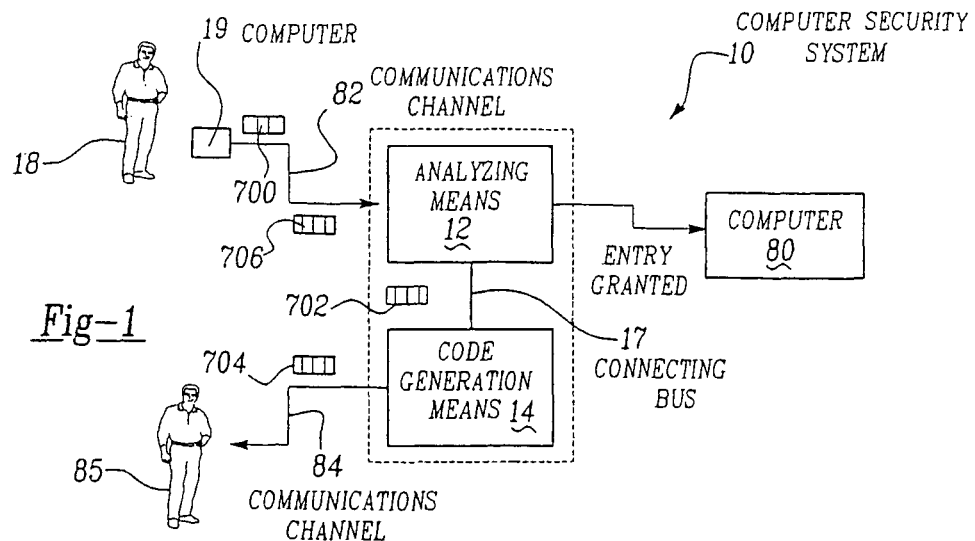
FIG. 1 is a block diagram of a computer security system made in accordance with the teachings of the preferred embodiment having the preferred security techniques of the invention.

Referring now to FIG. 1, there is shown a block diagram of a computer security system 10, made in accordance with the principles of the preferred embodiment of the invention and adapted for use in combination with computer 80. More particularly, computer security system 10 selectively allows communication and/or data processing access to computer 80 in a manner which is technically described throughout the remainder of this Application. As shown, security system 10 includes an "analyzing means" 12 and a "random code generating means" 14.

In one embodiment of the preferred embodiment of the invention, analyzing means 12 comprises one or more software subroutines which are adapted to execute upon and/or within computer 80. Alternatively, analyzing means 12 may comprise a microprocessor and/or similar type of computer which is adapted to operate under stored program control in the manner set forth in this Application. One example of another type of computer operating under stored program control and which may be used by the preferred embodiment of the invention is shown and described within chapter eight of the text entitled *Advanced Computer Architecture: Parallelism, Scalability, Programmability*, which was authored by Kai Hwang, which is published by McGraw-Hill, Inc., which has a library reference number of ISBN 0-07-031622-8, and the entire text of all of the chapters of which are fully and completely incorporated herein by reference, word for word and paragraph for paragraph. In either embodiment, analyzing means 12 receives and compares at least two "sets" or streams of data. Should the individually received "sets" match, analyzing means 12 generates and communicates an "access granted" command to computer 80, allowing individual 18 access to the computer 80. Moreover, random code generating means 14 may similarly comprise a conventional pseudo-random number generator which may be constructed or developed on one or more software subroutines which reside and operate/execute upon and/or within computer 80 or may comprise a microprocessor and/or similar type of computer which operates under stored program control.

In operation, individual 18, desiring access to and within computer 80 utilizes a first communication channel 82 (e.g. a first telephone line, radio channel, and/or satellite channel) and communicates, by use of his or her voice or by use of a computer 19 a first password to analyzing means 12. Analyzing means 12 then checks and/or compares this first received password with a master password list which contains all of the authorized passwords associated with authorized entry and/or access to computer 80.

Figure 5:
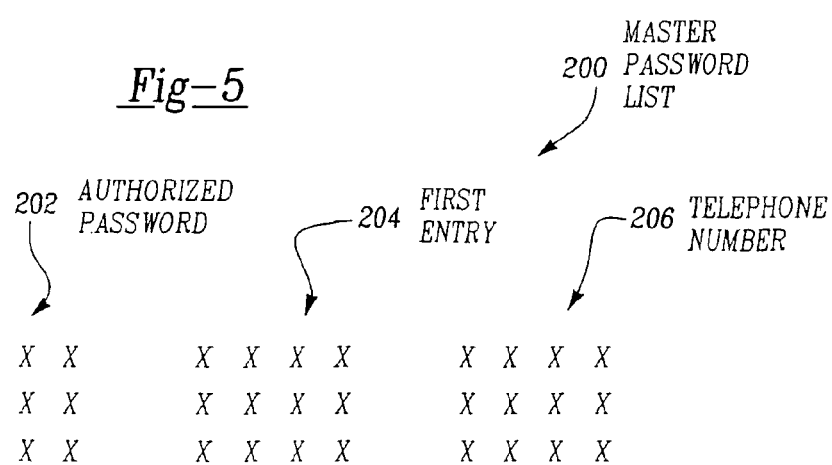
FIG. 5 is a schematic diagram of a password table used by the computer security systems shown in FIGS. 1 and 2.

As shown in FIG. 5, in the preferred embodiment of the invention, analyzing means 12 contains a master password list 200 having a first column of entries corresponding to authorized passwords necessary to gain access to computer 80. Moreover, as further shown in FIG. 5, each authorized password 202, contained in this master password list 200, has a unique first entry 204 associated with it and which identifies the name of the authorized user who has been assigned that corresponding password and at least one telephone number 206 and/or network address associated with the identified user.

If the received password matches an entry of the master password list, analyzing means 12 generates a command, by means of connecting bus 17 or software message or function call to random code generating means 14 and causes the random code generation means 14 to generate a substantially random and/or pseudo-random number or code, of programmable length, and to transmit the number and/or code, by means of a second communications channel 84, to the individual 85 associated with the received password 202 in the master password list. That is, as should be apparent to one of ordinary skill in the art, code generation means 14 includes both a random number generator and a conventional and commercially available communications interface (e.g. modem and/or telephone/pager interface), allowing the generated pseudo-random code to be generated or communicated over a wide variety of mediums.

Further, it should be apparent that individual 85 may or may not be the same person as individual 18. If individual 18 was the individual identified in the master password list (e.g. "was authorized"), that individual 18 receives the pseudo-random number and transmits the number to the analyzing means 12, by means of communications channel 82. Once the pseudo-random number is received by the analyzing means 12, from channel 82, it is compared with the number generated by generation means 14. If the two codes are substantially the same, entry to computer 80 and/or to a certain part of computer 80 such as, without limitation, the hardware, software, and/or firmware portions of computer 80 is granted to individual 18. For instance, in another embodiment, table 200 of FIG. 5 could contain yet another set of entries specifying the directories or portions of computer 80 that the individual 18 was allowed to have access to. In this manner, allowed access to computer 80 would be further restricted to those computer portions which are specified within table 200. It should be apparent to one of ordinary skill in the art that these portions may be different for different users and that each authorized user may have a different portion that may be accessed in an authorized manner.

It should be apparent to one of ordinary skill in the art that Applicant's foregoing computer security technique is a relatively low-cost, but effective technique, for properly ensuring that only authorized users gain access to a computer system, such as computer system 80. That is, Applicant's foregoing computer security embodiment, utilizes two distinct communications channels and a random number generator in order to ensure that an authorized user of a computer system is notified that someone or something is seeking access to the computer system with his or her password. Moreover, Applicant's foregoing invention is very cost effective as it employs substantially "off the shelf" and readily available components. Further, the use of a "secret" password, a "secret" substantially random number, and a "secret" second channel allows for multiple levels of security before access to the computer system is achieved and provides enhanced security over the prior art.

Figure 6:
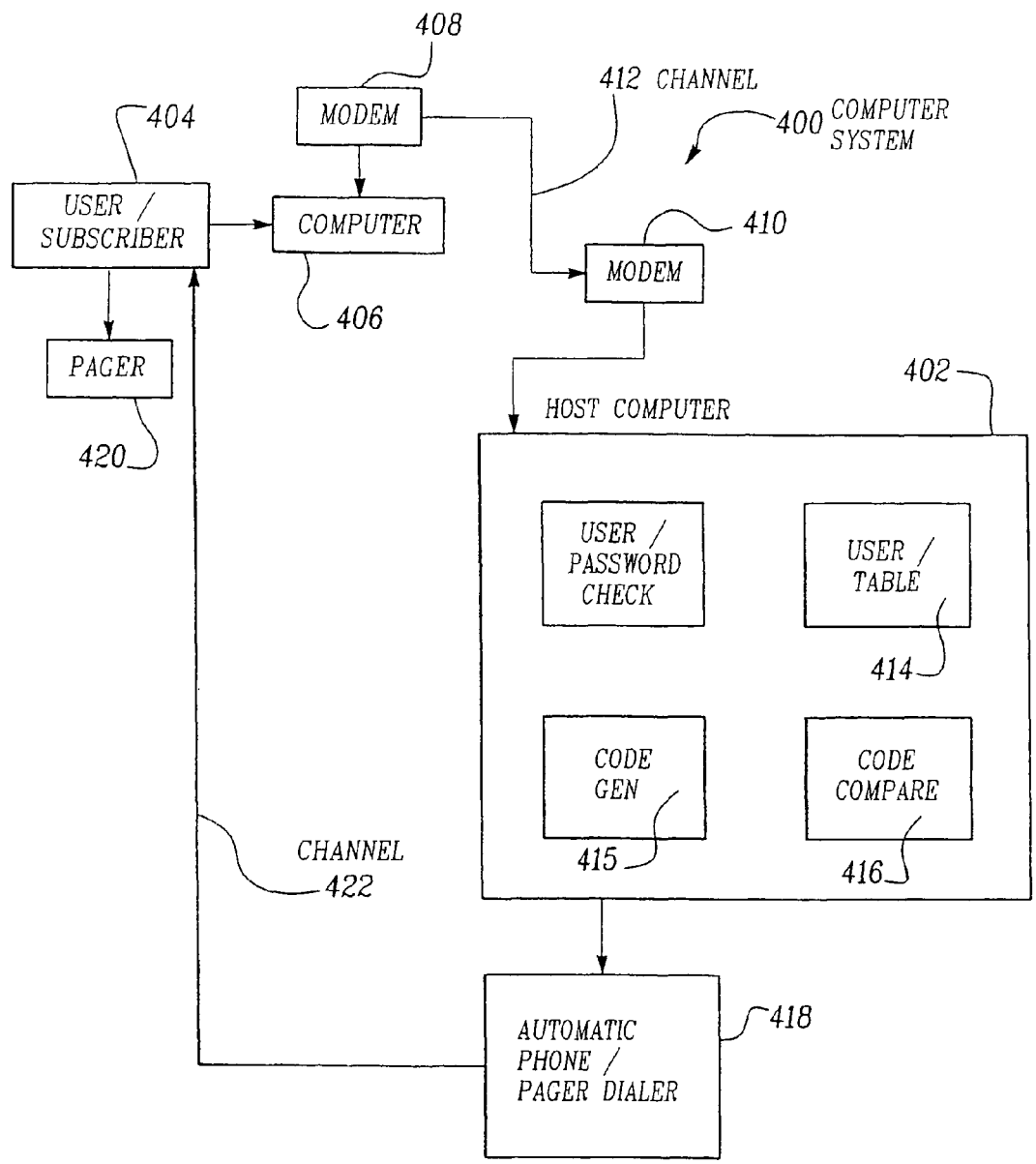
FIG. 6 is a block diagram of one embodiment of the preferred embodiment of the invention.
Figure 7:
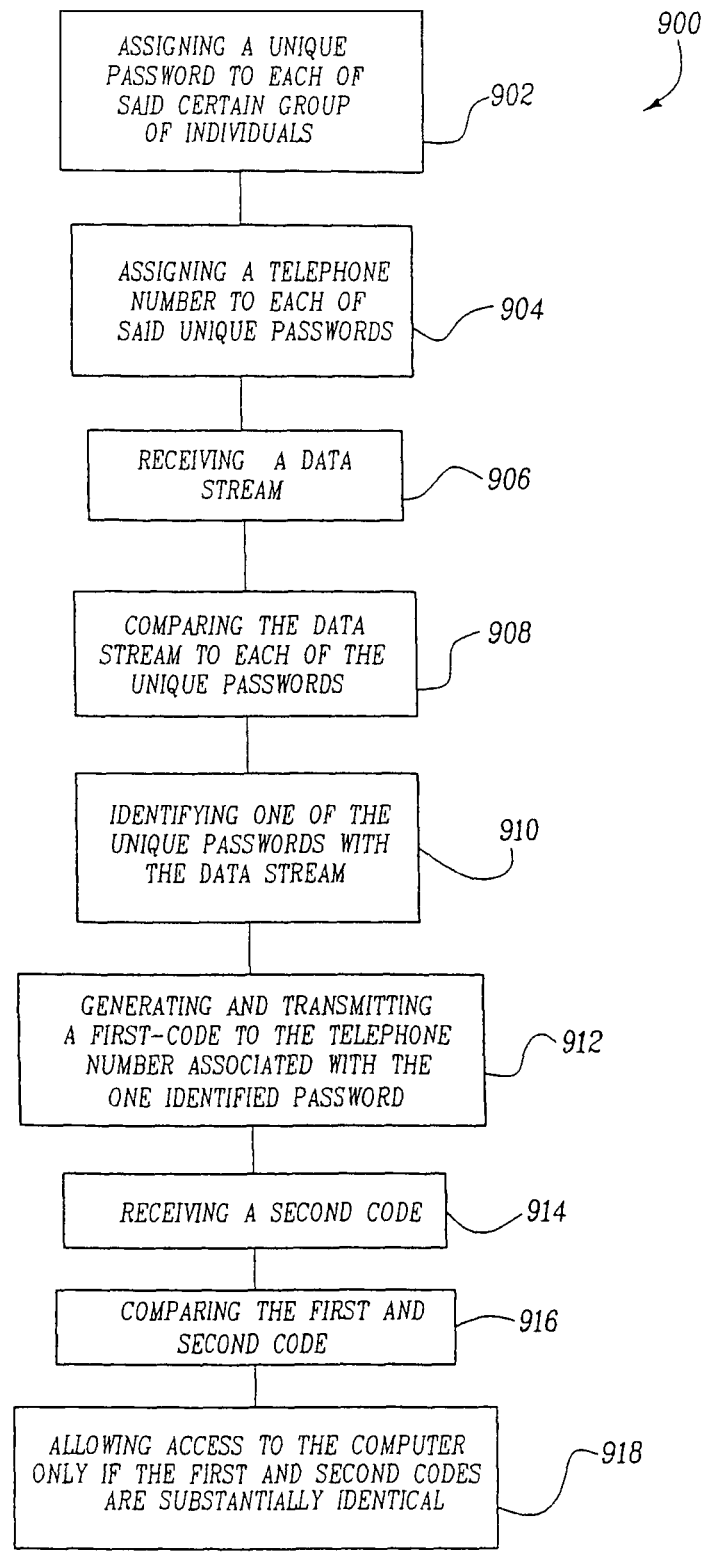
FIG. 7 is a flow chart illustrating a process of allowing access to a computer only if first and second codes are substantially identical.

Referring now to FIG. 6 there is shown a computer system 400 made in accordance with the teachings of the preferred embodiment of the invention and representing one example and/or implementation which is made in accordance with the various teachings of the preferred embodiment of the invention. As shown, computer system 400 includes a host computer 402 (corresponding to computer 80 of the system shown in FIG. 1) to which a user or other individual 404 (corresponding to individual 18 of FIG. 1) desires access to. As further shown in FIG. 6. As shown, individual 404, in this implementation example, utilizes a commercially available and conventional computer 406 and a commercially available and conventional modem 408 to communicate with a commercially available and conventional modem 410 by means of a typical communications channel (e.g. a conventional "dial-up" telephone line) 412. Hence, the user 404, in this embodiment, only requires conventional computer equipment. Host computer 402, in this embodiment, requires a conventional and commercially available automatic dialer which is altered, in a known manner, to receive and pass one or more passwords and/or codes as data.

In operation, user 404 dials through and/or by means of his or her computer 406 and modem 408 in the usual and conventional manner to connect and access host computer 402. The host computer 402, using the principles of the preferred embodiment of this invention, answers the requester's call, which occurs over channel 412, and requests and receives the user's identification code. Host computer 402 checks the received identification code and cross references the received password code against a pager phone number list resident within the user table 414 which is stored within computer 402. This comparison, is a match is made, causes the "code generator" software subroutine 415, resident within computer 402, to generate a pseudo-random number code and passes the received code along with the authorized user's pager number to the commercially available and conventional automatic dialer 418. The automatic dialer 418 telephones the conventional and commercially available pager 420 by means of conventional and commercially available communication channel 422 (e.g. voice line) and transmits the code to the user's pager. As this happens, the host computer 402 awaits the reply from the user attempting to gain access to the computer.

The user 404 now enters the code he or she has received from the pager 420 and any timing instructions which, in yet another embodiment of the invention may also be transmitted from computer 402, and sends this password or pseudo-random code back to computer 402 where it is compared within the software subroutine module denoted as "code compare" 416 in FIG. 6. If the comparison yields a match, the user 404 is allowed access to computer 402 and/or to a portion of computer 402.

Figure 2:
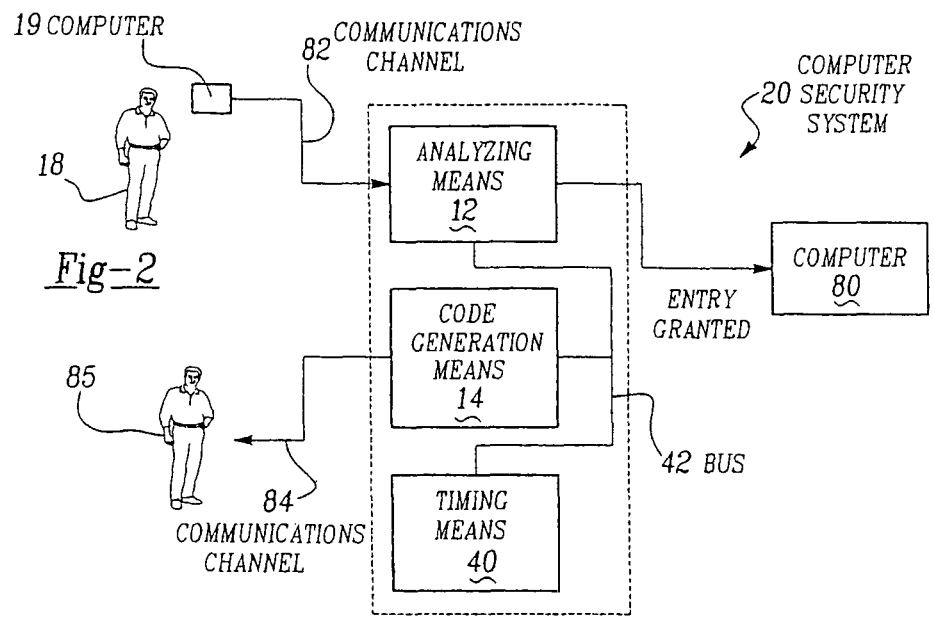
FIG. 2 is a block diagram of another embodiment of a computer security system made in accordance with the teachings of the preferred embodiment having the preferred techniques of the invention.

Referring now to FIG. 2, there is shown a second embodiment of a computer security system made in accordance with the teachings of the preferred embodiment of the invention. This second embodiment 20 is substantially similar to system 10 but also includes a timer or "timing means" 40 which may comprise one or more software subroutines which are adapted to operate and/or execute within and/or upon computer 80 or may comprise a microprocessor which operates under stored program control. In one embodiment, timing means 40 comprises a conventional "watchdog timer" as will be apparent to those of ordinary skill in the art.

In operation, timing means 40 records the time at which the first and second passwords are received by analyzing means 12. Timing means 40, in one embodiment which is coupled to analyzing means 12 and code generation means 14 by bus 42 and in another embodiment which is in software communication with means 12 and 14, then compares the times to determine whether the second password was received within a predetermined period or predetermined "window" of time after the first password was received. In the preferred embodiment of the invention, the predetermined period of time is programmable. The predetermined period of time, will typically need to vary according to the nature or the communications medium used by means 14 to notify individual 85 of the value of the generated code. For example, the predetermined period of time would be shorter when communications channel 84 comprises a pager or cellular phone, since the owner has immediate access to the code upon transmission; and longer when communications channel 84 comprises a voice-mail system which the owner has to affirmatively access to receive the code. If the second password was not received within the predetermined period of time, analyzing means 12 denies entry to the secured domain (e.g. computer 80). If the second password was received within the predetermined period of time, analyzing means 12 compares it to the code which was previously generated. If the second password is not substantially identical to the previously generated code, analyzing means 12 denies individual 18 entry to the secured domain (e.g. computer 80). If the received password is substantially identical to the code, analyzing means 12 grants individual 18 entry into the secured domain. As will be readily apparent to those of ordinary skill in the art, timing means 40 provides yet a third level of security to computer system 80. Moreover, it should also be apparent to one of ordinary skill in the art that this "predetermined time" may be as short or as small as several milli-seconds or micro-seconds. This is particularly true if, in yet another embodiment of Applicant's invention, the password generated by communication means 14 is received by a computerized device which is adapted to received the password and to generate a new password code in a substantially automatic manner.

Figure 3:
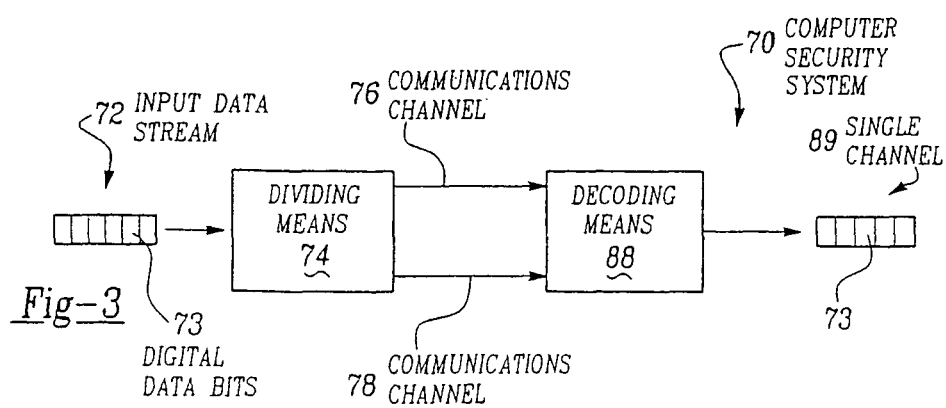
FIG. 3 is a block diagram of yet another embodiment of a security system made in accordance with the teachings of the preferred embodiment having the preferred techniques of the invention.

Referring now to FIG. 3, there is shown a block diagram of a third embodiment of a computer security system made in accordance with the principles of the preferred embodiment of the invention. As shown, computer security system 70 is adapted to receive an input data stream 72, comprising in a first embodiment, a plurality of digital data bits 73, which are to be securely transmitted to a distant site. System 70, as further shown, includes a data stream dividing means 74 which in one embodiment comprises a commercially available one input and two channel output time division or statistical multiplexor which samples the bits of received data and places, in a certain predetermined manner (e.g. alternately) some of the received data bits onto the first communications channel 76 and some of the received data bits onto the second communications channel 78. In this manner, one attempting to wrongfully intercept and/or access the data stream 72 would need access to both communications channels 76, 78 and would need to know the dividing algorithm that dividing means 74 utilizes to divide the received data for placement onto channels 76,78. Applicant's third embodiment therefore provides a very high level of data transmission security.

As further shown in FIG. 3, in this third embodiment of the invention, security system 70 further includes a decoding means 88 which may comprise a commercially available microprocessor operating under stored algorithmic program control and which contains "mirror image" of the algorithm used to divide the data stream transmitted to it by means 74. In this manner, the data from each of the channels 76,78 is reconstituted onto single channel 89, in substantially the exact same manner that it was received by means 74. In essence, this third embodiment of Applicant's invention allows and/or provides for the "splitting" of a data stream into a plurality of channels in a predetermined manner and the concomitant reconstitution of the data stream once the data has traversed the communications medium. Hence, the embodiment in FIG. 3 splits the data stream so that anyone getting access to one of the channels 76, 78 can't reconstruct the data stream because they're missing half or more of the information. If more channels are used, each channel carries far less than one-half the information.

Figure 4:
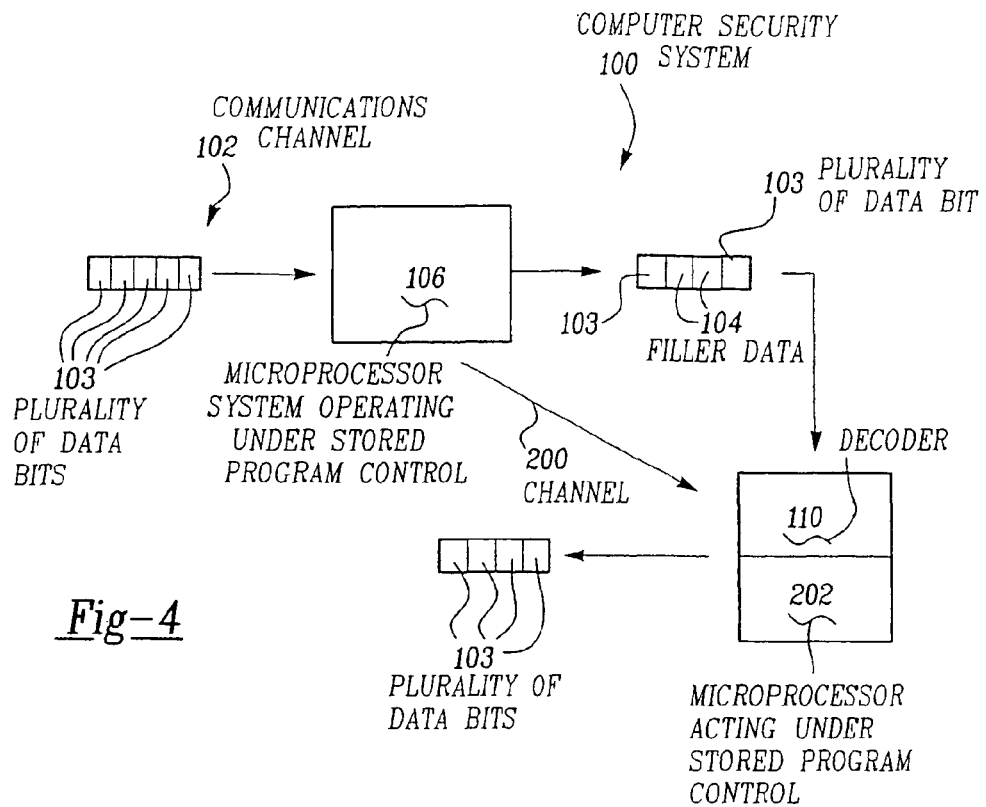
FIG. 4 is a block diagram of another embodiment of a computer security system made in accordance with the teachings of the preferred embodiment having the preferred techniques of the invention.

Referring now to FIG. 4 there is shown a fourth embodiment of a computer security and/or data transmission system 100 which is made in accordance with the teachings of the preferred embodiment of the invention. As shown, system 100 is adapted to receive a plurality of data bits 103 contained in a first communications channel 102. It should be noted that the data contained within this channel 102 is interspersed with a plurality of "non-data" or filler data bits or "material" 104 according to some predetermined and/or randomly varying algorithm (e.g. every third bit space is filler data) by a microprocessor system 106 which is operating under stored program control. The filler data 104 is binary data and cannot be deciphered as "filler" by an unauthorized user. Therefore, even if one were to intercept the transmitted data, one could not decipher or decode the data. System 100 further includes a decoder 110 for the data reception and decodes 202 for the algorithm reception which, in one embodiment, comprises a microprocessor acting under stored program control and which is adapted to "strip off" the "filler" bits and to allow the originally transmitted data to be reconstituted. In this manner, data may be safely transmitted and received in an authorized manner. In yet another embodiment of the invention which is shown in FIG. 4, the algorithm which controls the filler pattern and/or the way that the filler data is interspersed within the "regular" data pattern may be periodically changed in a known and predetermined manner. In this embodiment, the filler data is interspersed within the "regular" data according to a varying filler algorithm (e.g. every three bits for the first 99 bits and then every four bits thereafter). In this embodiment, decoder 110 is adapted to "strip" off these filler bits by having prior knowledge (e.g. embedded within a computer program resident within and controlling the decoder) of the varying algorithms which are utilized by system 100. Here, in the embodiment shown in FIG. 4, unlike that shown and described with respect to FIG. 3, all the data is transmitted on a single channel but is "muddied."

In yet another embodiment of the invention, as shown in FIG. 4, a varying data key is transmitted to decoder 110 and/or decoder 202 by microprocessor system 106 by use of a second channel 200. In this manner, a second channel is needed to tell or communicate the manner in which the filler data is interspersed within the regular data so that the decoder 110 may "strip off" the filler data. In this manner, the filler patterns may be dynamically changed. Hence, this system utilizes dual/multi channel media to communicate the cryptic modulation of the data with filler.

It is to be understood that the invention is not limited to the exact construction or method illustrated and described above, but that various changes and modifications may be made without departing from the spirit and scope of the invention as defined in the following claims.

The invention claimed is:

1. An apparatus comprising:
a computing device; and
computer-executable instructions residing on the computing device and configured to, in response to execution by the computing device, cause the computing device to:
receive an indication of an entity via a first communication channel;
receive a request to access one or more portions of a resource;
generate a first code;
transmit the first code via a second communication channel for receipt by the indicated entity, wherein the first communication channel is different from the second communication channel;
receive a second code transmitted from a remote location, wherein the second code was generated in response to the indicated entity receiving the first code which is identical to the second code;
compare the first code generated by the computing device with the second code received by the computing device to determine that the second code is identical to the first code; and
in response to the determination that the second code is identical to the first code, grant the request to access the one or more portions of the resource.

2. The apparatus of claim 1, wherein the first communication channel comprises one of a telephone line, a radio channel, or a satellite channel.

3. The apparatus of claim 1, wherein the entity is part of a plurality of entities, wherein each of the plurality of entities is associated with a unique password configured to enable access to one or more portions of the resource.

4. The apparatus of claim 1, wherein the resource includes a plurality of computer directories, and wherein the entity is authorized to access less than all of the plurality of computer directories.

5. The apparatus of claim 1, wherein the entity is located at the remote location.

6. The apparatus of claim 1, wherein the computer-executable instructions are configured to, in response to execution by the computing device, cause the computing device to transmit the first code via the second communication channel utilizing one or more of a phone number or a network address associated with the entity associated with the password.

7. The apparatus of claim 1, wherein the computer-executable instructions are configured to, in response to execution by the computing device, cause the computing device to receive the request to access the one or more portions of the resource from the entity.

8. The apparatus of claim 1, wherein the second code was automatically generated by a device at the remote location in response to the device at the remote location receiving the first code.

9. The apparatus of claim 1, wherein the resource comprises a source data stream and wherein the instructions are further configured to, in response to execution by the computing device, cause the computing device to:
divide the source data stream into at least a first data stream and a second data stream;
transmit the first data stream over a first communication data channel; and
transmit the second data stream over a second communication data channel different from the first communication data channel.

10. The apparatus of claim 1, wherein the resource comprises a source data stream and wherein the instructions are further configured to, in response to execution by the computing device, cause the computing device to:
encode the data stream by interspersing filler bits within the data stream with an encoding algorithm;
transmit the encoded data stream over a first communication data channel; and
provide an indication of the encoding algorithm over a second communication data channel different from the first communication data channel.

11. The apparatus of claim 1, wherein granting the request to access the one or more portions of the resource is further in response to a determination that the second code was received within a predetermined window of time in relation to the first code.

12. The apparatus of claim 11, wherein the predetermined window of time is less than ten milliseconds.

13. A computer-readable memory, excluding a transitory propagating signal, storing instructions configured to, in response to being executed by a computing device, cause the computing device to perform operations comprising:
receiving an indication of an entity via a first communication channel;
receiving a request to access one or more portions of a resource;
generating a first code;
transmitting the first code via a second communication channel for receipt by the indicated entity, wherein the first communication channel is different from the second communication channel;
receiving a second code transmitted from a remote location, wherein the second code was generated in response to the indicated entity receiving the first code which is identical to the second code;
determining that the second code is identical to the first code; and
in response to the determination that the second code is identical to the first code, granting the request to access the one or more portions of the resource.

14. The computer-readable memory of claim 13, wherein the first communication channel comprises one of a telephone line, a radio channel, or a satellite channel.

15. The computer-readable memory of claim 13, wherein the resource comprises one or more computing devices.

16. The computer-readable memory of claim 13, wherein generating the first code comprises randomly generating the first code.

17. The computer-readable memory of claim 13, wherein the resource comprises directories of a computing device and wherein granting the request to access the one or more portions of the resource comprises granting access to less than all of the directories.

18. The computer-readable memory of claim 13, wherein transmitting the first code via a second communication channel for receipt by the entity comprises transmitting the first code via one of a telephone line, a radio channel, or a satellite channel.

19. A method implemented by a computing device, the method comprising:
   receiving an indication of an entity via a first communication channel;
   receiving a request to access one or more portions of a resource;
   generating a first code;
   transmitting the first code via a second communication channel for receipt by the indicated entity, wherein the first communication channel is different from the second communication channel;
   receiving a second code transmitted from a remote location, wherein the second code was generated in response to the indicated entity receiving the first code which is identical to the second code;
   determining that the second code is identical to the first code; and
   in response to determining that the second code is identical to the first code, granting the request to access the one or more portions of the resource.

20. The method of claim 19, wherein the resource comprises one or more computing devices.

21. The method of claim 19, wherein the resource comprises directories of a computing device and wherein granting the request to access the one or more portions of the resource grants access to less than all of the directories.

22. The method of claim 19, wherein the request to access one or more portions of the resource comprises receiving the request from the entity associated with a password.

23. The method of claim 19, wherein the entity is associated with the remote location.

* * * * *